US009614366B2

(12) United States Patent
Kojima

(10) Patent No.: US 9,614,366 B2
(45) Date of Patent: Apr. 4, 2017

(54) PROTECTING CIRCUIT AND INTEGRATED CIRCUIT

(71) Applicant: Cypress Semiconductor Corporation, San Jose, CA (US)

(72) Inventor: Tomokazu Kojima, San Jose, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 15/082,882

(22) Filed: Mar. 28, 2016

(65) Prior Publication Data

US 2016/0336738 A1 Nov. 17, 2016

Related U.S. Application Data

(60) Provisional application No. 62/162,485, filed on May 15, 2015.

(51) Int. Cl.
*H02H 9/04* (2006.01)
*H02H 9/00* (2006.01)

(52) U.S. Cl.
CPC .............. *H02H 9/001* (2013.01); *H02H 9/04* (2013.01)

(58) Field of Classification Search
CPC .................................. H02H 9/001; H02H 9/04
USPC ....................................................... 361/91.1
See application file for complete search history.

(56) References Cited

U.S. PATENT DOCUMENTS

| 6,040,733 | A | 3/2000 | Casper et al. |
| 6,140,928 | A | 10/2000 | Shibuya et al. |
| 6,775,112 | B1 | 8/2004 | Smith et al. |
| 7,518,846 | B1 * | 4/2009 | Meyer ............ H02H 9/046 361/56 |
| 7,777,996 | B2 | 8/2010 | Loh et al. |
| 8,102,632 | B2 | 1/2012 | Liang et al. |
| 8,605,404 | B2 | 12/2013 | Chang et al. |
| 8,648,578 | B2 | 2/2014 | Zhao et al. |

(Continued)

FOREIGN PATENT DOCUMENTS

JP 2016056716 A 4/2016

OTHER PUBLICATIONS

Carlton, Ross, et al. "Improving the Transient Immunity Performance of Microcontroller-Based Applications," dated Jun. 2005; 60 pages.

(Continued)

*Primary Examiner* — Scott Bauer

(57) ABSTRACT

Described herein are a protecting circuit and an integrated circuit capable of discharging electric current sufficient for an input voltage having a large time variation while suppressing power consumption. The protecting circuit includes: a first shunt circuit including a first shunt pathway connected to an input terminal, the first shunt circuit being configured to have a relatively low discharge capacity of the first shunt pathway and a relatively long response time; a second shunt circuit including a second shunt pathway connected to the input terminal, the second shunt circuit being configured to have a relatively high discharge capacity of the second shunt pathway and a relatively short response time; and a control circuit configured to enable the second shunt pathway to discharge based on a time variation of an input voltage at the input terminal.

20 Claims, 13 Drawing Sheets

(56) References Cited

U.S. PATENT DOCUMENTS

| | | |
|---|---|---|
| 2007/0285854 A1* | 12/2007 | Rodgers ................. H02H 3/006 361/56 |
| 2010/0277841 A1 | 11/2010 | Riviere et al. |
| 2012/0016832 A1 | 1/2012 | Berard et al. |
| 2015/0236503 A1 | 8/2015 | Zhu et al. |
| 2015/0288173 A1 | 10/2015 | Chen et al. |

OTHER PUBLICATIONS

International Search Report for International Application No. PCT/US2016/024651 dated Jun. 27, 2016; 2 pages.
Written Opinion of the International Searching Authority for International Application No. PCT/US2016/024651 dated Jun. 27, 2016; 14 pages.

* cited by examiner

PROTECTING CIRCUIT AND INTEGRATED CIRCUIT

PRIORITY

This application claims the priority and benefit of U.S. Provisional Application No. 62/162,485, filed on May 15, 2015, the entire content of which is incorporated by reference herein.

BACKGROUND

Conventionally, as a source circuit including a particular type of protecting circuit, a circuit may include: a first comparator configured to output a first output signal, a second comparator configured to output a second output signal, and a determining unit configured to determine the presence or absence of conduction angle control of an AC voltage and whether the conduction angle control is a phase control system or an opposite phase control system based on a time difference between the first output signal and the second output signal.

On the other hand, there is a trade-off relationship of discharge capacity and response speed with power consumption for a shunt circuit that includes a comparator and a transistor to discharge electric current based on an input voltage of a predetermined value in order to protect a protected circuit. Therefore, in such a shunt circuit, it is difficult to discharge electric current sufficient for a sharply varying input voltage while suppressing power consumption.

SUMMARY

Some embodiments provide a protecting circuit and an integrated circuit capable of discharging electric current sufficient for an input voltage having a large time variation while suppressing power consumption.

In some embodiments, a protecting circuit comprises: a first shunt circuit including a first shunt pathway connected to an input terminal, the first shunt circuit being configured to have a relatively low discharge capacity of the first shunt pathway and a relatively long response time; a second shunt circuit including a second shunt pathway connected to the input terminal, the second shunt circuit being configured to have a relatively high discharge capacity of the second shunt pathway and a relatively short response time; and a control circuit configured to enable the second shunt pathway to discharge based on a time variation of an input voltage at the input terminal.

In some embodiments, an integrated circuit comprises a protected circuit connected to an input terminal and a protecting circuit, where the protecting circuit comprises: a first shunt circuit including a first shunt pathway connected to the input terminal, the first shunt circuit being configured to have a relatively low discharge capacity of the first shunt pathway and a relatively long response time; a second shunt circuit including a second shunt pathway connected to the input terminal, the second shunt circuit being configured to have a relatively high discharge capacity of the second shunt pathway and a relatively short response time; and a control circuit configured to enable the second shunt pathway to discharge based on a time variation of an input voltage at the input terminal.

In the embodiments presented herein, the terms "unit", "part", "device" and "system" not only mean physical mechanisms, but also include realization of functions that the "unit", "part", "device" and "system" have, by software. The function that one "unit", "part", "device" or "system" has may be realized by two or more physical mechanisms or devices. Alternatively, the two or more functions of "unit", "part", "device" and "system" may be realized by one physical mechanism or device.

BRIEF DESCRIPTION OF THE DRAWINGS

The accompanying drawings are incorporated herein and form a part of the specification.

In the drawings, like reference numbers generally indicate identical or similar elements.

DETAILED DESCRIPTION

Figure 1:
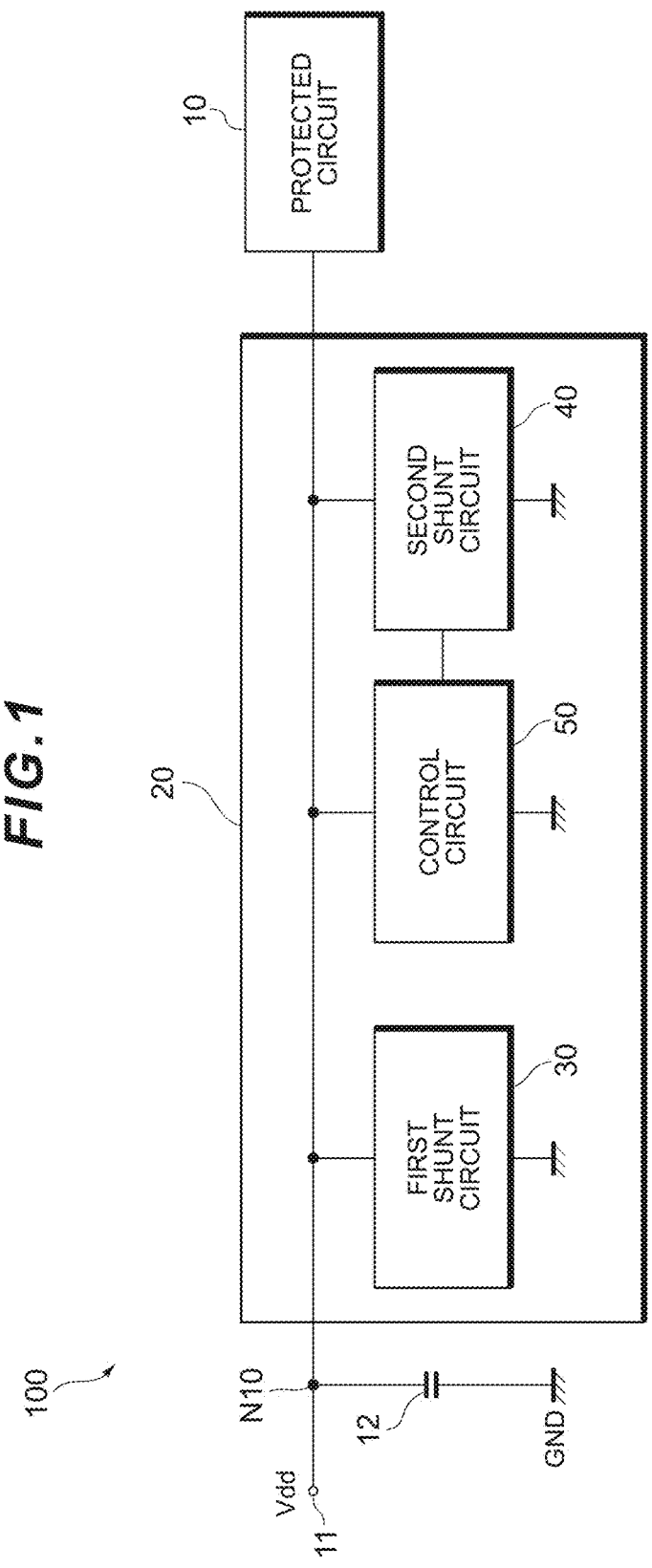
FIG. 1 is a block diagram illustrating an example of an integrated circuit according to one embodiment.

FIG. 1 to FIG. 13 are drawings for describing an example embodiment. FIG. 1 is a block diagram illustrating an integrated circuit 100 according to the example embodiment. The integrated circuit 100 is, for example, a semiconductor integrated circuit, such as an IC, made up mainly of semiconductor devices. For example, as illustrated in FIG. 1, the integrated circuit 100 includes a protected circuit 10 and a protecting circuit 20.

The protected circuit 10 is, for example, a main part for realizing the function of the integrated circuit 100. For example, the protected circuit 10 can be configured to include multiple semiconductor devices. The protected circuit 10 is connected to an input terminal 11. Supply voltage Vdd is supplied to the protected circuit 10 through the input terminal 11, and the protected circuit 10 is configured to operate at an operating voltage Vop or less (to be described later) based on the supply voltage Vdd.

The supply voltage Vdd is supplied to the input terminal 11. The supply voltage Vdd is voltage generated by energy harvesting using natural energy such as photovoltaic, geothermal, or wind power, or renewable energy. In this case, the value of the supply voltage Vdd depends on the voltage generated by energy harvesting, which can vary with time. The supply voltage Vdd of the embodiment corresponds to an example of "input voltage."

Therefore, when a supply voltage Vdd higher than or equal to breakdown voltage Vbd (to be described later) is input to the input terminal 11 (Vbd>Vop), there is a danger that the protected circuit 10 will be broken by this supply voltage Vdd.

The protecting circuit 20 is arranged between the input terminal 11 and the protected circuit 10. The protecting circuit 20 is configured to protect the protected circuit 10 from a supply voltage Vdd that is higher than the operating voltage Vop. In other words, the protecting circuit 20 is configured such that, when a supply voltage Vdd higher than the operating voltage Vop is input from the input terminal 11, electric current based on the supply voltage Vdd is discharged in order not to apply to the protected circuit 10 the supply voltage Vdd that is higher than or equal to the breakdown voltage Vbd. On the other hand, the protecting circuit 20 is configured such that, when a supply voltage Vdd lower than or equal to the operating voltage Vop is input to the input terminal 11, no electric current is discharged so the supply voltage Vdd is applied directly to the protected circuit 10.

The integrated circuit 100 may further include, for example, an input capacitor 12. In this case, one end of the input capacitor 12 is connected to a node N10 between the input terminal 11 and the protecting circuit 20, and the other end is connected to the ground GND.

The protecting circuit 20 includes, for example, a first shunt circuit 30, a second shunt circuit 40, and a control circuit 50.

Figure 2:
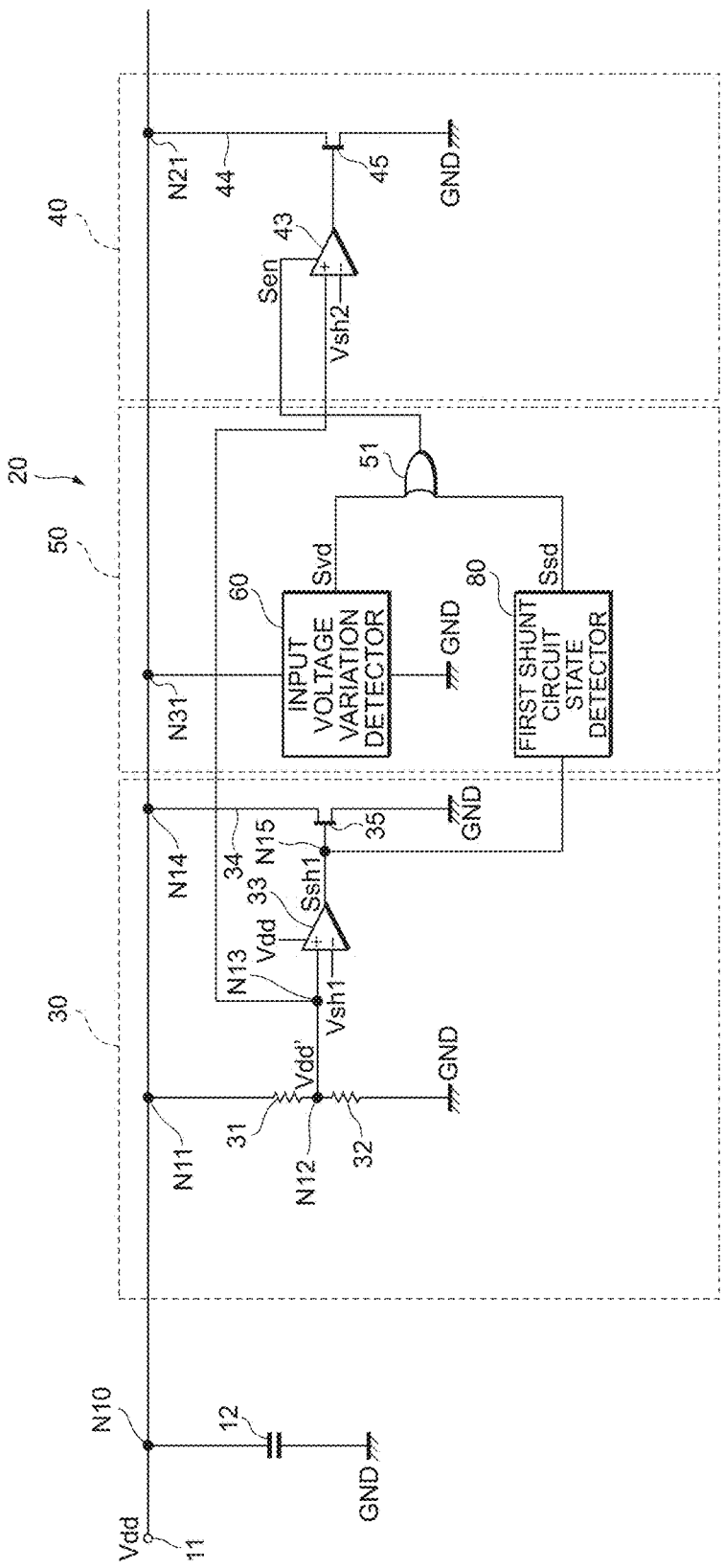
FIG. 2 is a block diagram illustrating an example of a protecting circuit according to one embodiment.

FIG. 2 is a block diagram illustrating an example of the protecting circuit 20 according to one embodiment. As illustrated in FIG. 2, the first shunt circuit 30 includes a first shunt pathway 34 connected to the input terminal 11. The first shunt circuit 30 is configured such that electric current dischargeable by the first shunt pathway 34, i.e., the discharge capacity of the first shunt pathway 34, is relatively low and the response time is relatively long. As an example, the first shunt circuit 30 is such that the current dischargeable to the first shunt pathway 34 is about 0.1 mA and the response time is about 50 μs. In this example, power consumption when the first shunt circuit 30 operates is about 50 nA.

The first shunt circuit 30 further includes, for example, a resistor 31 and a resistor 32, a first comparator 33, and a first shunt switch 35.

The resistor 31 and the resistor 32 are connected in series to each other, and arranged between a node N11 connected to the input terminal 11 and the ground GND. The resistor 31 and the resistor 32 divide the voltage at the node N11, i.e., the supply voltage Vdd by division ratios according to respective resistance values to generate divided supply voltage Vdd' at a node N12.

Since the divided supply voltage Vdd' is obtained by dividing the supply voltage Vdd by a predetermined division ratio, the voltage value is only lowered relative to the supply voltage Vdd. Therefore, for example, the time variation of the divided supply voltage Vdd' is equivalent to the time variation of the supply voltage Vdd.

The first comparator 33 is configured to drive the first shunt switch 35 based on the divided supply voltage Vdd'. The non-inverting input terminal of the first comparator 33 is connected to a node N13, at which the voltage is the same as the voltage at the node N12, and the voltage Vdd' divided by the resistor 31 and the resistor 32 is input thereto. A predetermined first shunt voltage Vsh1 is input to the inverting input terminal of the first comparator 33. Further, the supply voltage Vdd is input to the first comparator 33 as the power supply.

When the supply voltage Vdd is higher than or equal to a predetermined value, e.g., higher than or equal to the minimum operating voltage, the first comparator 33 operates, while when the supply voltage Vdd is lower than the predetermined value, the first comparator 33 is deactivated. Usually, since the predetermined value at which the first comparator 33 operates is small enough compared with the value of the supply voltage Vdd input to the input terminal 11, the first comparator 33 continues to operate while the supply voltage Vdd is input to the input terminal 11 and consumes power.

The first comparator 33 compares the divided supply voltage Vdd' with the first shunt voltage Vsh1 to output a first shunt signal Ssh1 based on the comparison result. For example, when the divided supply voltage Vdd' is higher than the first shunt voltage Vsh1, the first comparator 33 outputs the first shunt signal Ssh1 having a relatively high voltage level (hereinafter called the "H level"). On the other hand, for example, when the divided supply voltage Vdd' is lower than or equal to the first shunt voltage Vsh1, the first comparator 33 outputs the first shunt signal Ssh1 having a relatively low level (hereinafter called the "L level").

The first shunt pathway 34 is configured to be able to discharge electric current based on the supply voltage Vdd. The first shunt pathway 34 is, for example, a conductive wire, one end of which is connected to a node N14 connected to the input terminal 11 and the other end of which is connected to the ground GND.

The first shunt switch 35 is provided on the first shunt pathway 34. The first shunt switch 35 is, for example, an n-channel metal-oxide semiconductor field-effect transistor (hereinafter called "MOSFET"), whose drain is connected to the node N14 and source is connected to the ground GND.

The first shunt signal Ssh1 of the first comparator 33 is input to the gate of the first shunt switch 35. The H-level voltage of the first shunt signal Ssh1 is set to a value larger enough than that of a threshold voltage for the first shunt switch 35. Therefore, when the first shunt signal Ssh1 is in the H level, the first shunt switch 35 is turned on, and the first shunt pathway 34 is electrically connected. This leads to discharging of the electric current based on the supply voltage Vdd through the first shunt pathway 34 as the drain current of the first shunt switch 35. On the other hand, when the first shunt signal Ssh1 is in the L level, the first shunt switch 35 is turned off, and the first shunt pathway 34 is electrically disconnected.

The second shunt circuit 40 includes a second shunt pathway 44 connected to the input terminal 11. The second shunt circuit 40 is configured to have an amount of electric current dischargeable by the second shunt pathway 44, i.e., a relatively high discharge capacity of the second shunt pathway 44, and a relatively short response time. As an example, the second shunt circuit 40 is such that the electric current dischargeable into the second shunt pathway 44 is about 100 mA and the response time is about 0.1 μs. In this example, power consumption when the second shunt circuit 40 operates is about 10 μA.

The term "discharge capacity" in this application refers to electric current dischargeable per unit time, i.e., the amount of charge per unit time. As the unit of "discharge capacity," for example, ampere (A) or joule (J) is used. Thus, when the discharge capacity is relatively low, the maximum value of the electric current dischargeable per unit time is relatively small, while when the discharge capacity is relatively high, the maximum value of the electric current dischargeable per unit time is relatively large. On the other hand, when the response time is relatively long, the time until the discharge current reaches this maximum value is relatively long, while when the response time is relatively short, the time until the discharge current reaches this maximum value is relatively short. Thus, the amount of electric current (current integral value) is determined based on the discharge capacity and the response time.

The second shunt circuit 40 further includes, for example, a second comparator 43 and a second shunt switch 45.

The second comparator 43 is configured to drive the second shunt switch 45 based on the divided supply voltage Vdd'. The non-inverting input terminal of the second comparator 43 is connected to the node N13 of the first shunt circuit 30, and the divided supply voltage Vdd' is input thereto. Further, a predetermined second shunt voltage Vsh2 is input to the inverting input terminal of the second comparator 43. Further, an enable signal Sen is input from the control circuit 50 (to be described later) to the second comparator 43 as the supply voltage.

When the enable signal Sen is in the H level, the second comparator 43 operates, while when the enable signal Sen is in the L level, the second comparator 43 is deactivated. In other words, when the enable signal Sen is in the H level, the second comparator 43 consumes power, while when the enable signal Sen is in the L level, the second comparator 43 consumes no power.

When the enable signal Sen having the H level is input, the second comparator 43 compares the divided supply voltage Vdd' with the second shunt voltage Vsh2, and outputs a second shunt signal Ssh2 based on the comparison result. For example, when the divided supply voltage Vdd' is higher than the second shunt voltage Vsh2, the second comparator 43 outputs the second shunt signal Ssh2 having the H level. On the other hand, for example, when the divided supply voltage Vdd' is lower than or equal to the second shunt voltage Vsh2, the second comparator 43 outputs the second shunt signal Ssh2 having the L level.

The second shunt pathway 44 is configured to be able to discharge electric current based on the supply voltage Vdd. The second shunt pathway 44 is, for example, a conductive wire, one end of which is connected to a node N21 connected to the input terminal 11 and the other end of which is connected to the ground GND.

The second shunt switch 45 is provided on the second shunt pathway 44. The second shunt switch 45 is, for example, an n-channel MOSFET whose drain is connected to the node N21 and source is connected to the ground GND.

The second shunt signal Ssh2 of the second comparator 43 is input to the gate of the second shunt switch 45. The H-level voltage of the second shunt signal Ssh2 is set to a value larger enough than that of a threshold voltage for the second shunt switch 45. Therefore, when the second shunt signal Ssh2 is in the H level, the second shunt switch 45 is turned on, and the second shunt pathway 44 is electrically connected. This leads to discharging of the electric current based on the supply voltage Vdd through the second shunt pathway 44 as the drain current of the second shunt switch 45. On the other hand, when the second shunt signal Ssh2 is in the L level, the second shunt switch 45 is turned off, and the second shunt pathway 44 is electrically disconnected.

The control circuit 50 is configured to control the second shunt circuit 40. The control circuit 50 includes, for example, an input voltage variation detector 60, a first shunt circuit state detector 80, and an OR circuit 51.

The input voltage variation detector 60 is configured to enable the second shunt pathway 44 to discharge based on the time variation of the supply voltage Vdd. More specifically, the input voltage variation detector 60 is configured to activate the second comparator 43 in the second shunt circuit 40 based on the time variation of the supply voltage Vdd. The input voltage variation detector 60 is connected to a node N31 connected to the input terminal 11, and the supply voltage Vdd is input thereto. The input voltage variation detector 60 is configured to detect the time variation of the supply voltage Vdd, and output a variation detection signal Svd based on the detection result.

The first shunt circuit state detector 80 is configured to enable the second shunt pathway 44 to discharge based on the time required to discharge the electric current based on the supply voltage Vdd into the first shunt pathway 34, i.e., the operating time of the first shunt switch 35. The first shunt circuit state detector 80 is connected to a node N15 in the first shunt circuit 30, and the first shunt signal Ssh1 of the first comparator 33 is input thereto. The first shunt circuit state detector 80 is configured to detect the operating time of the first shunt switch 35, and output a state detection signal Ssd based on the detection result.

The variation detection signal Svd of the input voltage variation detector 60, and the state detection signal Ssd of the first shunt circuit state detector 80 are input to the OR circuit 51. The OR circuit 51 performs an OR operation on the variation detection signal Svd and the state detection signal Ssd to output the enable signal Sen mentioned above. In other words, the enable signal Sen becomes the L level when both the variation detection signal Svd and the state detection signal Ssd are in the L level, or the H level when at least either of the variation detection signal Svd and the state detection signal Ssd is in the H level.

The control circuit 50 thus configured consumes little power. As an example, the power consumption of the control circuit 50 is about 3 nA. Therefore, the power consumption of the first shunt circuit 30 and the second shunt circuit 40 accounts for most of the power consumption in the protecting circuit 20.

In general, the amount of electric current dischargeable per predetermined time, e.g., the discharge capacity, and the response time in a shunt circuit provided in the protecting circuit have a trade-off relationship with the power consumption. In other words, a shunt circuit having a relatively high discharge capacity and a relatively short response time tends to consume more power. On the other hand, a shunt circuit consuming less power tends to have a low discharge capacity and a long response time. Therefore, in conventional protecting circuits, the discharge capacity, the response time, and the power consumption of a shunt circuit are set to be adequate for the intended use and purpose.

Figure 3:
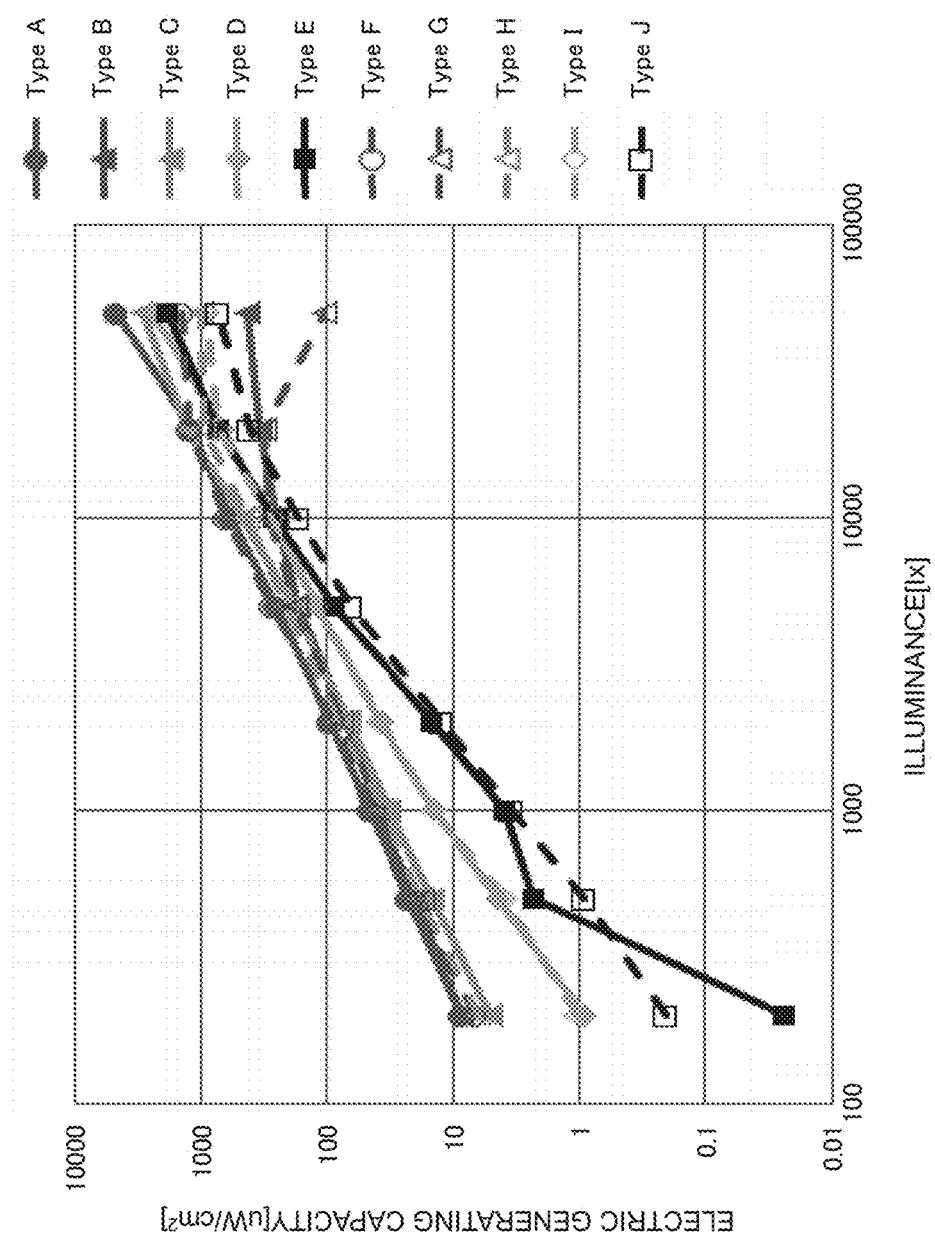
FIG. 3 is a graph representing an example of a relationship between illuminance in electric power generation by light energy and electric generating capacity.

FIG. 3 is a graph representing an example of a relationship between illuminance in electric power generation by light energy and electric generating capacity. As illustrated in FIG. 3, the light energy greatly increases the illuminance scale depending on the type of light, and the electric generating capacity of the light energy tends to become very high. Specifically, as an example, when the light energy is indoor light, the illuminance is about 100 1x, and the electric generating capacity is about 2 µW/cm² (e.g., 2 µW of power generated by a photovoltaic electric source with an area of 1 cm²). On the other hand, as an example, when the light energy is sunlight, the illuminance is about 20000 1x, and the electric generating capacity is about 30 mW/cm².

Suppose that such energy harvesting is used as the electric source of the integrated circuit 100. In this case, for example, even when indoor light is usually incident on the photovoltaic electric source to generate a supply voltage Vdd having a low voltage value, if sunlight suddenly enters the electric source to generate a supply voltage Vdd having a high voltage value, the supply voltage Vdd input to the input terminal 11 may rise sharply.

In contrast to conventional protecting circuits, in some embodiments the protecting circuit 20 includes the first shunt circuit 30 including the first shunt pathway 34 connected to the input terminal 11 and configured to have a relatively low discharge capacity of the first shunt pathway 34 and a relatively long response time. Therefore, for example, when indoor light is incident on the photovoltaic electric source to generate supply voltage Vdd having a low voltage value, the first shunt circuit 30 operates to enable the discharge of part of electric current based on the supply voltage Vdd into the first shunt pathway 34. At this time, the first shunt circuit 30 continues to operate during the input of the supply voltage Vdd, but the power consumption thereof is low.

Further, the protecting circuit 20 includes: the second shunt circuit 40 including the second shunt pathway 44 connected to the input terminal 11 and configured to have a relatively high discharge capacity of the second shunt pathway 44 and a relatively short response time; and the control circuit 50 configured to enable the second shunt pathway 44 to discharge based on the time variation of supply voltage Vdd input to the input terminal 11. Therefore, for example, when sunlight suddenly enters the photovoltaic electric source on which the indoor light was incident to generate supply voltage Vdd having a high voltage value, since the time variation of the supply voltage Vdd becomes large, the control circuit 50 can discharge high electric current into the second shunt pathway 44 at high speed based on the time variation of this supply voltage Vdd. Although the power consumption of the second shunt circuit 40 is high, the control circuit 50 can activate the second shunt circuit 40 when the time variation of the supply voltage Vdd is large in order to suppress the power consumption of the second shunt circuit 40.

Note that the control circuit 50 can operate when the supply voltage Vdd is lower than or equal to the minimum operating voltage Vmin (to be described later).

Next, the operation of the protecting circuit 20 having the above structure will be described in four typical cases, e.g., first to fourth cases.

The first case is a case where a supply voltage Vdd input to the input terminal 11 is higher than or equal to the operating voltage Vop of the protected circuit 10, and the time variation of the supply voltage Vdd is smaller than or equal to a predetermined variation, e.g., where a rise in supply voltage Vdd per unit time is smaller than or equal to a first value.

Figure 4:
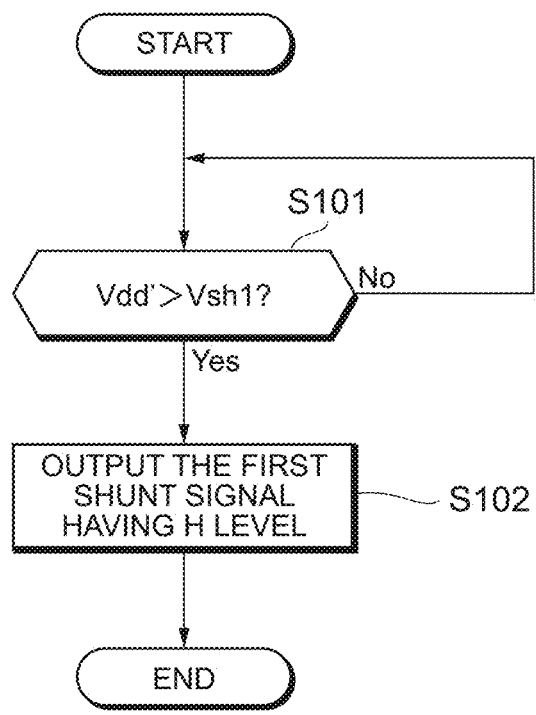
FIG. 4 is a flowchart for describing an example of the operation of a first shunt circuit according to one embodiment.

FIG. 4 is a flowchart for describing an example of the operation of the first shunt circuit 30 according to the embodiment. For example, when supply voltage Vdd is input to the input terminal 11, the first shunt circuit 30 starts a first shunt process S100 illustrated in FIG. 4.

As illustrated in FIG. 4, the first comparator 33 first determines whether the divided supply voltage Vdd' is higher than the first shunt voltage Vsh1 (Vdd'>Vsh1) (S101).

The first comparator 33 repeats step S101 until the divided supply voltage Vdd' exceeds the first shunt voltage Vsh1. While the divided supply voltage Vdd' is lower than or equal to the first shunt voltage Vsh1, since the first comparator 33 outputs the first shunt signal Ssh1 having the L level, the first shunt switch 35 is off.

As a result of the determination in S201, when the divided supply voltage Vdd' is higher than the first shunt voltage Vsh1, the first comparator 33 outputs the first shunt signal Ssh1 having the H level (S102). This results in turning on the first shunt switch 35 to discharge electric current into the first shunt pathway 34.

After step S102, the first shunt circuit 30 completes the first shunt process S100.

Figure 5:
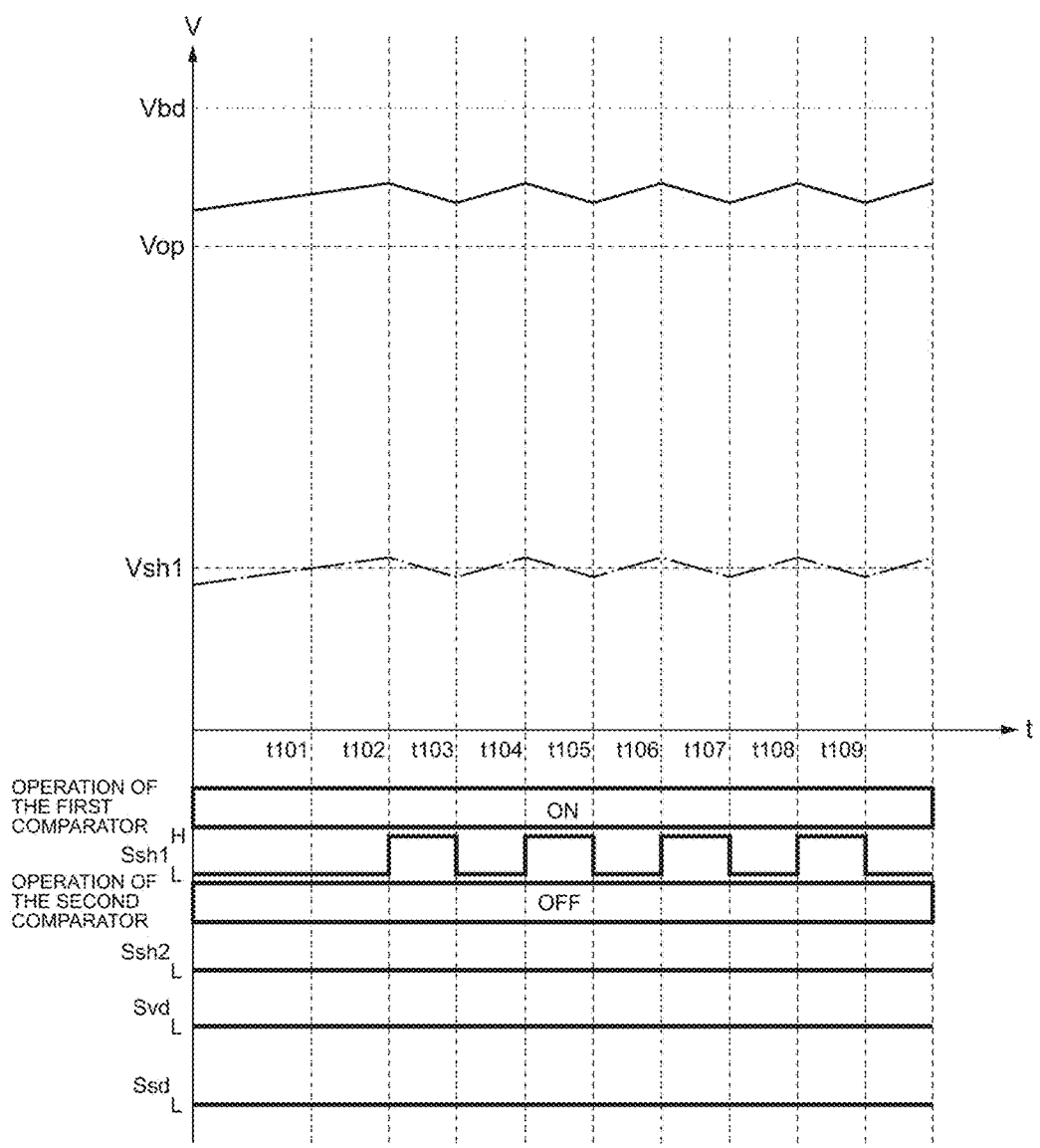
FIG. 5 is a timing chart for describing the example of the operation of the first shunt circuit according to one embodiment.

FIG. 5 is a timing chart for describing the example of the operation of the first shunt circuit 30 according to the embodiment. In FIG. 5, the horizontal axis represents time, and in the upper graph of FIG. 5, the vertical axis represents voltage with the supply voltage Vdd indicated by the solid line and the divided supply voltage Vdd' indicated by the dot-and-dash line. Further, in the drawings after FIG. 5 and the following description, a state where each part of the protecting circuit 20 consumes power is expressed as "the operation is on" and a state where each part of the protecting circuit 20 consumes no power is expressed as "the operation is off." As illustrated in FIG. 5, when the supply voltage Vdd is higher than or equal to the operating voltage Vop, and the divided supply voltage Vdd' exceeds the first shunt voltage Vsh1 at time t101 as a result of a gradual increase in the supply voltage Vdd and the divided supply voltage Vdd', the first shunt switch 35 is turned on to pass electric current through the first shunt pathway 34 in order to enable the discharge of the electric current. In practice, since a delay occurs due to the response time of the first comparator 33 and the response time of the first shunt switch 35, the first shunt switch 35 is turned on at timing of time t102 after a predetermined time has elapsed from time t101.

Then, when the divided supply voltage Vdd' becomes lower than or equal to the first shunt voltage Vsh1 as a result of a gradual decrease in the supply voltage Vdd and the divided supply voltage Vdd' due to the discharge of electric current from the first shunt pathway 34, the first shunt switch 35 is turned off to stop discharging through the first shunt pathway 34. In practice, since a delay occurs due to the response time of the first comparator 33 and the response time of the first shunt switch 35, the first shunt switch 35 is turned off at timing of time t103 after a predetermined time has elapsed since the divided supply voltage Vdd' became lower than or equal to the first shunt voltage Vsh1.

On the other hand, since the rise in the supply voltage Vdd per unit time is smaller than or equal to a first value, the variation detection signal Svd of the input voltage variation detector 60 is in the L level. Further, since the operating time of the first shunt switch 35 is short, the state detection signal Ssd of the first shunt circuit state detector 80 is also in the L level. As a result, the operation of the second comparator 43 in the second shunt circuit 40 is off, and the second shunt signal Ssh2 of the second comparator 43 is in the L level.

FIG. 4 illustrates an example in which the first shunt circuit 30 completes the first shunt process S100 after step S102, but this is merely a non-limiting example. For example, as illustrated in FIG. 5, when the supply voltage Vdd and the divided supply voltage Vdd' rise again after the first shunt switch 35 is turned off at time t103, the first shunt circuit 30 may repeat steps S101 and S102 before completing the first shunt process S100.

Figure 6:
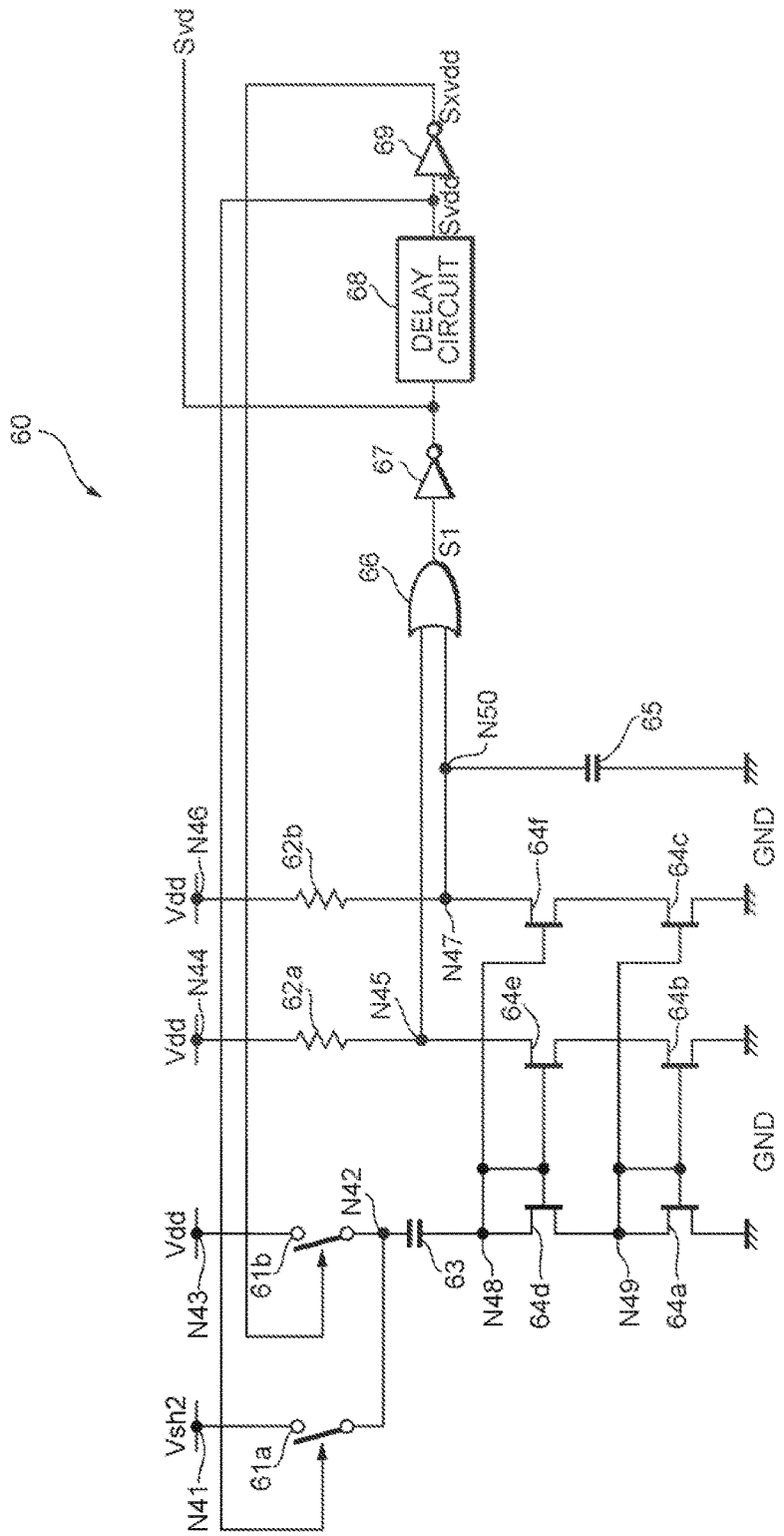
FIG. 6 is a circuit diagram illustrating an example of an input voltage variation detector according to one embodiment.

FIG. 6 is a circuit diagram illustrating an example of the input voltage variation detector 60 according to an example embodiment. As illustrated in FIG. 6, the input voltage variation detector 60 includes, for example, a switch 61a and a switch 61b, a resistor 62a and a resistor 62b, a detection capacitor 63, transistors 64a to 64f, a capacitor 65, an OR circuit 66, an inverter 67, a delay circuit 68, and an inverter 69.

One end of the switch 61a is connected to a node N41, and the other end is connected to a node N42. The second shunt voltage Vsh2 is input to the node N41. Further, a delay signal Svdd (to be described later) is input to the switch 61a, and the switch 61a electrically connects or disconnects the node N41 and the node N42 based on the delay signal Svdd.

One end of the switch 61b is connected to a node N43, and the other end is connected to the node N42. The supply voltage Vdd is input to the node N43. Further, an exclusive delay signal Sxvdd (to be described later) is input to the switch 61b, and the switch 61b electrically connects or disconnects the node N43 and the node N42 based on the exclusive delay signal Sxvdd.

One end of the resistor 62a is connected to a node N44, and the other end is connected to a node N45. The supply voltage Vdd is input to the node N44. The resistor 62a is a so-called pull-up resistor to bring the voltage at the node N45 to the H level when both the transistor 64b and the transistor 64e (to be described later) are off.

One end of the resistor 62b is connected to a node N46, and the other end is connected to a node N47. The supply voltage Vdd is input to the node N46. The resistor 62b is a so-called pull-up resistor to bring the voltage at the node N47 to the H level when both the transistor 64c and the transistor 64f (to be described later) are off.

One end of the detection capacitor 63 is connected to the node N42, and the other end is connected to a node N48. The second shunt voltage Vsh2 or the supply voltage Vdd is applied between the node N42 and the ground GND by the switching actions of the switch 61a and the switch 61b. The detection capacitor 63 accumulates electric charge by the second shunt voltage Vsh2 or the supply voltage Vdd.

The transistor 64a and the transistor 64d are connected in series between the node N48 and the ground GND. The transistor 64a is, for example, an n-channel MOSFET with the drain and gate connected to a node N49 and the source connected to the ground GND. The transistor 64d is, for example, an n-channel MOSFET with the drain and gate connected to the node N48 and the source connected to the node N49.

The transistor 64b and the transistor 64e are connected in series between the node N45 and the ground GND. The transistor 64b is, for example, an n-channel MOSFET with the gate connected to the node N49 and the source connected to the ground GND. The transistor 64e is, for example, an n-channel MOSFET with the gate connected to the node N48 and the drain connected to the node N45. Further, the drain of the transistor 64b and the source of the transistor 64e are connected to each other.

The transistor 64c and the transistor 64f are connected in series between the node N47 and the ground GND. The transistor 64c is, for example, an n-channel MOSFET with the gate connected to the node N49 and the source connected to the ground GND. The transistor 64f is, for example, an n-channel MOSFET with the gate connected to the node N48 and the drain connected to the node N47. Further, the drain of the transistor 64c and the source of the transistor 64f are connected to each other.

The transistors 64a to 64f thus connected act as a current mirror, particularly as a cascode current mirror. In other words, for example, when both the transistor 64a and the transistor 64d are turned on to pass electric current through, the transistor 64b and the transistor 64e, and the transistor 64c and the transistor 64f are all turned on. At this time, the electric current flowing through the transistor 64b and the transistor 64e, and the electric current flowing through the transistor 64c and the transistor 64f are the same or nearly the same as the electric current flowing through the transistor 64a and the transistor 64d due to the action of the current mirror. When both the transistor 64b and the transistor 64e are turned on, the voltage at the node N45 is changed from the H level to the L level. Similarly, when both the transistor 64c and the transistor 64f are turned on, the voltage at the node N47 is changed from the H level to the L level.

The electric charge accumulated in the detection capacitor 63 can flow into the transistor 64a and the transistor 64d as electric current of a mirror source of the current mirror. Since this current value is determined by the impedance of the detection capacitor 63, a value such as the capacity or frequency of the detection capacitor 63 can be set as the current value to determine electric current flowing through the transistor 64a and the transistor 64d.

For example, when the switch 61a is off and the switch 61b is on, the supply voltage Vdd is applied between the node N42 and the ground GND. In this case, no electric current flows into the transistor 64a and the transistor 64d unless the supply voltage Vdd is higher than or equal to a total value of threshold voltages for the transistor 64a and the transistor 64d. In other words, the input voltage variation detector 60 consumes no power without operating. Therefore, the total value of threshold voltages for the transistor 64a and the transistor 64d corresponds to the minimum operating voltage Vmin (to be described later).

One end of the capacitor 65 is connected to a node N50 having the same electric potential as the node N47, and the other end is connected to the ground GND. Therefore, the capacitor 65 accumulates electric charge while the node N47 is in the H level. On the other hand, when the node N47 becomes the L level, the capacitor 65 discharges the accumulated electric charge. The node N47 and the node N50 can maintain the H level until a predetermined time has elapsed since the node N45 was changed to the L level due to the discharging of the capacitor 65.

The voltage at the node N45 and the voltage at the node N50 are input to the OR circuit 66. The OR circuit 66 performs an OR operation on the voltage at the node N45 and the voltage at the node N50 to output a signal 51. In other words, when both the voltage at the node N45 and the voltage at the node N50 are in the L level, the signal 51 becomes the L level, while when at least either of the voltage at the node N45 and the voltage at the node N50 is in the H level, the signal 51 becomes the H level.

The signal S1 of the OR circuit 66 is input to the inverter 67. The inverter 67 inverts the level of the signal S1 and outputs the inverted signal as the variation detection signal Svd mentioned above.

The variation detection signal Svd of the inverter 67 is input to the delay circuit 68. The delay circuit delays this variation detection signal Svd for a predetermined time, and outputs it as the delay signal Svdd mentioned above.

The delay signal Svdd of the delay circuit 68 is input to the inverter 69. The inverter 69 inverts the level of the delay signal Svdd and outputs the inverted signal as the exclusive delay signal Sxvdd mentioned above.

Among the four cases mentioned above, the second case is a case where the supply voltage Vdd input to the input terminal 11 is higher than or equal to the minimum operating voltage Vmin of the input voltage variation detector 60, and the time variation of the supply voltage Vdd is larger than a predetermined variation, e.g., the rise in the supply voltage Vdd per unit time is greater than the first value.

Figure 7:
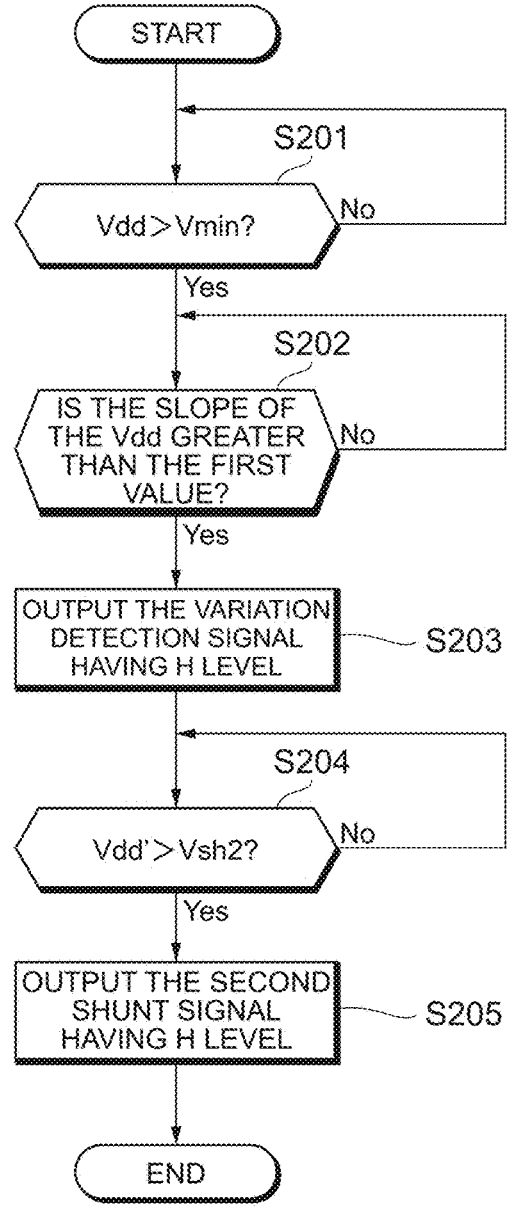
FIG. 7 is a flowchart for describing a first example of the operation of a second shunt circuit and a control circuit according to one embodiment.

FIG. 7 is a flowchart for describing a first example of the operation of the second shunt circuit 40 and the control circuit 50 according to one embodiment. When the supply voltage Vdd is input to the input terminal 11, the control circuit 50 starts a single second shunt process S200 illustrated in FIG. 7. At the start of the single second shunt process S200, the switch 61a illustrated in FIG. 6 is off and the switch 61b illustrated in FIG. 6 is on.

As illustrated in FIG. 7, the input voltage variation detector 60 first determines whether the supply voltage Vdd is higher than the minimum operating voltage Vmin (Vdd>Vmin) (S201).

The input voltage variation detector 60 repeats step S201 until the supply voltage Vdd becomes higher than the minimum operating voltage Vmin. While the supply voltage Vdd is lower than or equal to the minimum operating voltage Vmin, since both the node N45 and the node N47 are in the H level due to the pull-up actions of the resistor 62a and the resistor 62b illustrated in FIG. 6, both variation detection signals Svd are in the L level. At this time, since the state detection signal Ssd illustrated in FIG. 2 is also in the L level, the enable signal Sen of the OR circuit 51 is in the L level. As a result, the second comparator 43 does not operate, and the second shunt switch 45 is off.

As a result of the determination in S201, when the supply voltage Vdd is higher than the minimum operating voltage Vmin, the input voltage variation detector 60 determines whether the rise in the supply voltage Vdd per unit time, e.g., a slope of the supply voltage Vdd as a time-series signal, is greater than the first value (S202).

The input voltage variation detector 60 repeats steps S201 and S202 until the slope of the supply voltage Vdd becomes greater than the predetermined value. While the slope of the supply voltage Vdd is smaller than or equal to the first value, since both the transistor 64a and the transistor 64d illustrated in FIG. 6 are off and no electric current flows into the mirror source of the current mirror, both the node N45 and the node N47 remain in the H level due to the pull-up actions of the resistor 62a and the resistor 62b, and the variation detection signal Svd is in the L level. Further, since the state detection signal Ssd illustrated in FIG. 2 is also in the L level, the enable signal Sen of the OR circuit 51 is in the L level. As a result, the second comparator 43 does not operate, and the second shunt switch 45 is off. Thus, the second shunt circuit 40 consumes no power until the supply voltage Vdd becomes higher than the minimum operating voltage Vmin and the slope of the supply voltage Vdd becomes greater than the first value.

As a result of the determination in S202, when the slope of the supply voltage Vdd is greater than the first value, it is considered that the supply voltage Vdd rises sharply. For example, there is a case where sunlight suddenly enters a photovoltaic electric source on which indoor light was incident to increase generated voltage, or the like. In this case, the input voltage variation detector 60 outputs the variation detection signal Svd having the H level (S203). Thus, the enable signal Sen of the OR circuit 51 illustrated in FIG. 2 is changed from the L level to the H level, and the second comparator 43 in the second shunt circuit 40 is activated.

Next, the second comparator 43 determines whether the divided supply voltage Vdd' is higher than the second shunt voltage Vsh2 (Vdd'>Vsh2) (S204).

The second comparator 43 repeats step S204 until the divided supply voltage Vdd' becomes higher than the second shunt voltage Vsh2. Since the second comparator 43 outputs the second shunt signal Ssh2 having the L level while the divided supply voltage Vdd' is lower than or equal to the second shunt voltage Vsh2, the second shunt switch 45 is off.

As a result of the determination in S204, when the divided supply voltage Vdd' is higher than the second shunt voltage Vsh2, the second comparator 43 outputs the second shunt signal Ssh2 having the H level (S205). Thus, since the second shunt switch 45 is turned on, high electric current can be discharged into the second shunt pathway 44 at high speed to decrease the supply voltage Vdd sharply.

After step S205, the second shunt circuit 40 and the control circuit 50 complete the single second shunt process S200.

Figure 8:
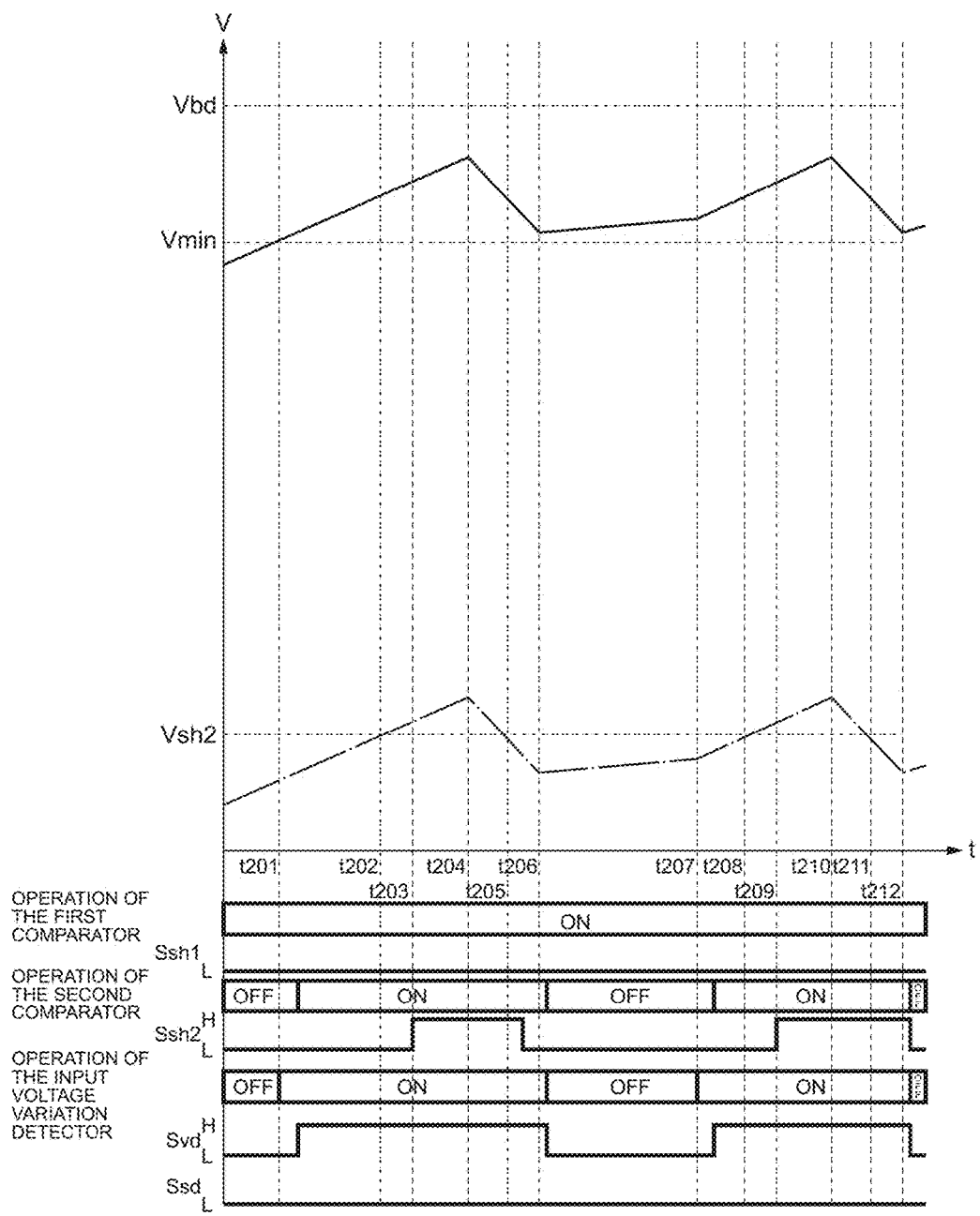
FIG. 8 is a timing chart for describing the first example of the operation of the second shunt circuit and the control circuit according to one embodiment.

FIG. 8 is a timing chart for describing the first example of the operation of the second shunt circuit 40 and the control circuit 50 according to the embodiment. In FIG. 8, the horizontal axis represents time, and in the upper graph of FIG. 8, the vertical axis represents voltage with the supply voltage Vdd indicated by the solid line and the divided supply voltage Vdd' indicated by the dot-and-dash line. As illustrated in FIG. 8, when the supply voltage Vdd exceeds the minimum operating voltage Vmin at time t201 as a result of a sharp rise in the supply voltage Vdd and the divided supply voltage Vdd', the operation of the input voltage variation detector 60 is turned on. At this time, the variation detection signal Svd is changed from the L level to the H level a little later than time t201 by the electric charge accumulated in the capacitor 65 illustrated in FIG. 6 to turn on the operation of the second comparator 43 illustrated in FIG. 2.

Next, when the supply voltage Vdd and the divided supply voltage Vdd continue to rise sharply and the divided supply voltage Vdd exceeds the second shunt voltage Vsh2 at time t202, the second shunt signal Ssh2 of the second comparator 43 becomes the H level. In practice, since a response delay occurs in the second comparator 43, the second shunt signal Ssh2 is changed from the L level to the H level at timing after a predetermined time has elapsed from time t202.

Next, when the second shunt signal Ssh2 becomes the H level at time t203, the second shunt switch 45 is turned on. In practice, since a response delay occurs in the second shunt switch 45, the second shunt switch 45 is changed from off to on at timing after a predetermined time has elapsed from time t203. As a result, high electric current flows into the second shunt pathway 44 at time t204 to decrease the supply voltage Vdd and the divided supply voltage Vdd' rapidly.

Next, when the supply voltage Vdd and the divided supply voltage Vdd' drop and the divided supply voltage Vdd' falls below the second shunt voltage Vsh2 at time t205, the second shunt signal Ssh2 of the second comparator 43 becomes the L level. In practice, since a response delay occurs in the second comparator 43, the second shunt signal Ssh2 is changed from the H level to the L level at timing after a predetermined time has elapsed from time t205. As a result, the second shunt switch 45 is turned off at time t206 to stop the drop in the supply voltage Vdd and the divided supply voltage Vdd'.

On the other hand, the input voltage variation detector 60 illustrated in FIG. 6 detects that the rise in the supply voltage Vdd per unit time becomes smaller than or equal to the first value at time t204. However, since the electric charge accumulated in the detection capacitor 63 continues to pass electric current through the transistor 64a and the transistor 64d, the node N45, the node N47, and the node N50 all maintain the L level. Therefore, the variation detection signal Svd maintains the H level for a period of time corresponding to the amount of electric charge accumulated in the detection capacitor 63 after time t204, and becomes the L level, for example, after time t206. As a result, the operation of the input voltage variation detector 60 and the second comparator 43 illustrated in FIG. 2 is turned off.

Alternatively, for example, the second comparator 43 may be so preset that the second shunt signal Ssh2 will become the L level when the enable signal Sen of the OR circuit 51 illustrated in FIG. 2 is in the L level.

Further, in the first shunt circuit 30 illustrated in FIG. 2, since the supply voltage Vdd is input to the input terminal 11, the operation of the first comparator 33 is on. However, since the response time of the first shunt circuit 30 is very long compared with the response time of the second shunt circuit 40, the first shunt circuit 30 cannot follow the sharp rise in the supply voltage Vdd and the divided supply voltage Vdd'. Therefore, even when the divided supply voltage Vdd' is higher than the first shunt signal Vsh1, the first shunt signal Ssh1 of the first comparator 33 remains in the L level. Then, since the first shunt circuit state detector 80 detects the operating time of the first shunt switch 35, the state detection signal Ssd of the first shunt circuit state detector 80 is in the L level.

Among the four cases mentioned above, the third case is a case where the supply voltage Vdd input to the input terminal 11 is higher than or equal to the minimum operating voltage Vmin of the input voltage variation detector 60, the rise in the supply voltage Vdd per unit time is greater than the first value, and further the supply voltage Vdd cannot be sufficiently decreased by one discharge by the second shunt circuit 40.

Figure 9:
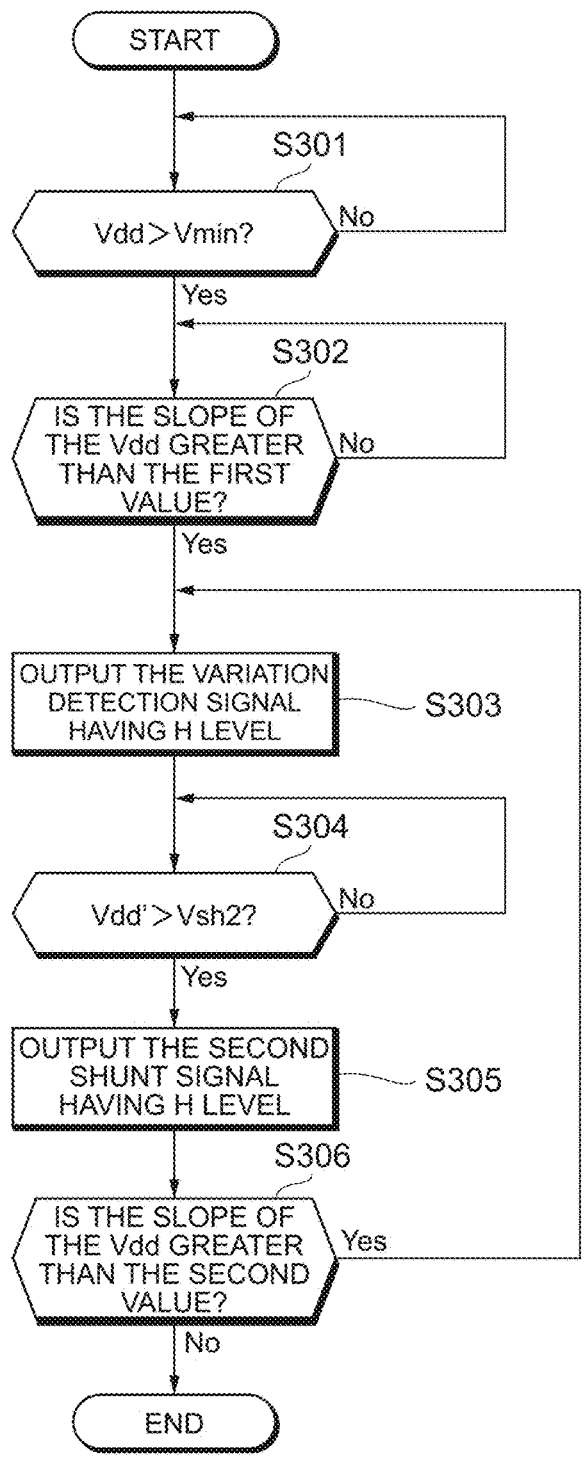
FIG. 9 is a flowchart for describing a second example of the operation of the second shunt circuit and the control circuit according to one embodiment.

FIG. 9 is a flowchart for describing a second example of the operation of the second shunt circuit 40 and the control circuit 50 according to one embodiment. For example, when the supply voltage Vdd is input to the input terminal 11, the control circuit 50 starts a multiple second shunt process S300 illustrated in FIG. 9. At the start of the multiple second shunt process S300, the switch 61a illustrated in FIG. 6 is off and the switch 61b illustrated in FIG. 6 is on.

Since steps S301 to S305 in the multiple second shunt process S300 are the same as the steps S201 to S205 in the single second shunt process S200 illustrated in FIG. 7, the description thereof will be omitted.

As illustrated in FIG. 9, after step S305, the input voltage variation detector 60 determines whether the rise in the supply voltage Vdd per unit time, e.g., the slope of the supply voltage Vdd as a time-series signal, is greater than a second value (S306). Here, the second value is a value smaller than the first value mentioned above.

For example, the input voltage variation detector 60 uses the delay signal Svdd and the exclusive delay signal Sxvdd illustrated in FIG. 6 to switch between on and off of the switches 61a and 61b in order to charge the detection capacitor 63 at the second shunt voltage Vsh2. Next, the input voltage variation detector 60 uses delay signal Svdd and the exclusive delay signal Sxvdd to switch between on and off of the switches 61a and 61b again to charge the detection capacitor 63 at the supply voltage Vdd. Thus, the slope of a voltage difference between the supply voltage Vdd and the second shunt voltage Vsh2 is detected. Detecting the slope of a voltage difference between the supply voltage Vdd and the second shunt voltage Vsh2 means that the slope of the supply voltage Vdd is greater than the second value.

As a result of the determination in S306, when the slope of the supply voltage Vdd is smaller than or equal to the second value, it is considered that the supply voltage Vdd drops sufficiently. Therefore, the second shunt circuit 40 and the control circuit 50 complete the multiple second shunt process S300.

On the other hand, as a result of the determination in S306, when the slope of the supply voltage Vdd is greater than the second value, it is considered that the supply voltage Vdd may reach the breakdown voltage Vbd of the protected circuit 10. Therefore, the input voltage variation detector 60 executes steps S303 to S306 again. Thus, discharging through the second shunt pathway 44 can be performed multiple times until the slope of the supply voltage Vdd becomes smaller than or equal to the second value.

The flowchart in FIG. 9 illustrates an example in which step S306 is executed after step S305 is illustrated, but this is merely a non-limiting example. Since steps S304 and S305 are executed by the second shunt circuit 40 and step S306 is executed by the control circuit 50, the second shunt circuit 40 and the control circuit 50 can execute steps S304 and S305, and step S306 in parallel, for example.

Figure 10:
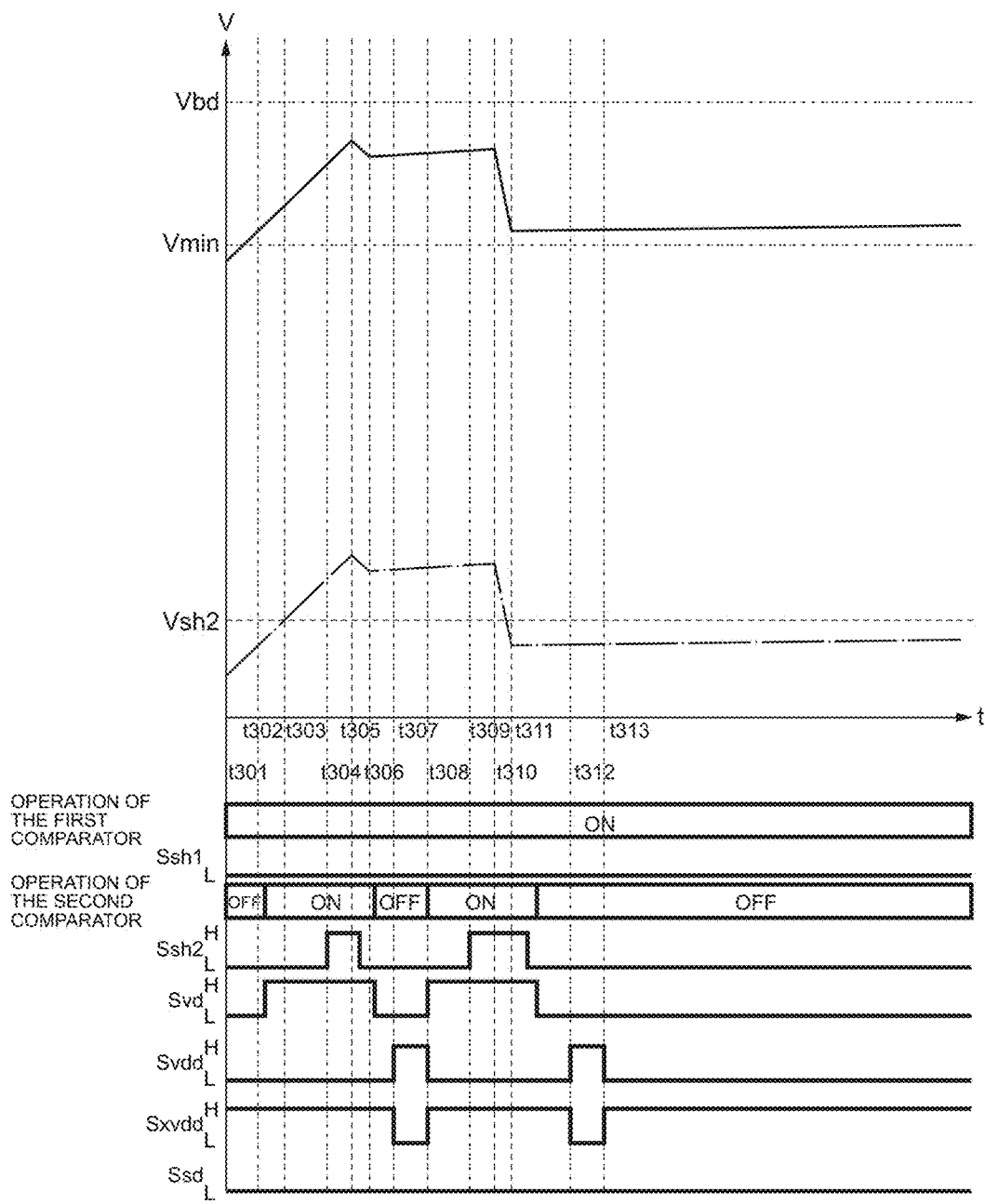
FIG. 10 is a timing chart for describing the second example of the operation of the second shunt circuit and the control circuit according to one embodiment.

FIG. 10 is a timing chart for describing the second example of the operation of the second shunt circuit 40 and the control circuit 50 according to one embodiment. In FIG. 10, the horizontal axis represents time, and in the upper graph of FIG. 10, the vertical axis represents voltage with the supply voltage Vdd indicated by the solid line and the divided supply voltage Vdd' indicated by the dot-and-dash line.

Since operations at times t301 to t304 are the same as those at times t201 to t204 illustrated in FIG. 8, the description thereof will be omitted.

As illustrated in FIG. 10, as a result of passing high electric current through the second shunt pathway 44 at time t304, the supply voltage Vdd and the divided supply voltage Vdd' drop. However, even when the variation detection signal Svd is changed from the H level to the L level at time t205, the supply voltage Vdd remains high and the divided supply voltage Vdd' exceeds the second shunt voltage Vsh2.

Next, when a predetermined delay time of the delay circuit 68 illustrated in FIG. 6 has elapsed since the variation detection signal Svd became the H level after time t302, the delay signal Svdd becomes the H level and the exclusive delay signal Sxvdd becomes the L level at time t306 to turn on and off the switch 61a and the switch 61b illustrated in FIG. 6, respectively. Thus, the second shunt voltage Vsh2 is applied to the detection capacitor 63 illustrated in FIG. 6.

Next, when a predetermined delay time of the delay circuit 68 has elapsed since the variation detection signal Svd became the L level after time t305, the delay signal Svdd becomes the L level and the exclusive delay signal Sxvdd becomes the H level at time t307 to turn off and on the switch 61a and the switch 61b illustrated in FIG. 6, respectively. Thus, the supply voltage Vdd is applied again to the detection capacitor 63 illustrated in FIG. 6.

When the supply voltage Vdd is applied again to the detection capacitor 63 illustrated in FIG. 6 at time t307, if the slope of the supply voltage Vdd is greater than the second value, the variation detection signal Svd will become the H level again. At this time, since the divided supply voltage Vdd' is higher than the second shunt voltage Vsh2, the second shunt signal Ssh2 of the second comparator 43 becomes the H level. In practice, since a response delay occurs in the second comparator 43, the second shunt signal Ssh2 is changed from the L level to the H level at timing after a predetermined time has elapsed from time t307.

Next, when the second shunt signal Ssh2 becomes the H level at time t308, the second shunt switch 45 is turned on. In practice, since a response delay occurs in the second shunt switch 45, the second shunt switch 45 is changed from off to on at timing after a predetermined time has elapsed from time t308. As a result, high electric current flows into the second shunt pathway 44 again at time t309 to decrease the supply voltage Vdd and the divided supply voltage Vdd' rapidly.

Next, when the supply voltage Vdd and the divided supply voltage Vdd' drop and the divided supply voltage Vdd' falls below the second shunt voltage Vsh2 during a period between time t309 and time t310, the second shunt signal Ssh2 becomes the L level. In practice, since a response delay occurs in the second comparator 43, the second shunt signal Ssh2 is changed from the H level to the L level at timing after a predetermined time has elapsed since the divided supply voltage Vdd' fell below the second shunt voltage Vsh2. As a result, the second shunt switch 45 is turned off at time t310 to stop the drop in the supply voltage Vdd and the divided supply voltage Vdd'.

On the other hand, the input voltage variation detector 60 illustrated in FIG. 6 detects that the rise in the supply voltage Vdd per unit time becomes smaller than or equal to the first value and the voltage variation becomes smaller than or equal to a predetermined value at time t309. However, since the electric charge accumulated in the detection capacitor 63 continues to pass electric current through the transistor 64a and the transistor 64d, the node N45, the node N47, and the node N50 all maintain the L level. Therefore, the variation detection signal Svd maintains the H level for a period of time corresponding to the amount of electric charge accumulated in the detection capacitor 63 after time t309, and becomes the L level, for example, after time t310. As a result, the operation of the input voltage variation detector 60 and the second comparator 43 illustrated in FIG. 2 is turned off.

Alternatively, for example, the second comparator 43 may be so preset that the second shunt signal Ssh2 will become the L level when the enable signal Sen of the OR circuit 51 illustrated in FIG. 2 is in the L level.

Further, in the first shunt circuit 30 illustrated in FIG. 2, since the supply voltage Vdd is input to the input terminal 11, the operation of the first comparator 33 is on. However, since the response time of the first shunt circuit 30 is very long compared with the response time of the second shunt circuit 40, the first shunt circuit 30 cannot follow the sharp rise in the supply voltage Vdd and the divided supply voltage Vdd'. Therefore, even when the divided supply voltage Vdd' is higher than the first shunt signal Vsh1, the first shunt signal Ssh1 of the first comparator 33 remains in the L level. Then, since the first shunt circuit state detector 80 detects the operating time of the first shunt switch 35, the state detection signal Ssd of the first shunt circuit state detector 80 is in the L level.

Figure 11:
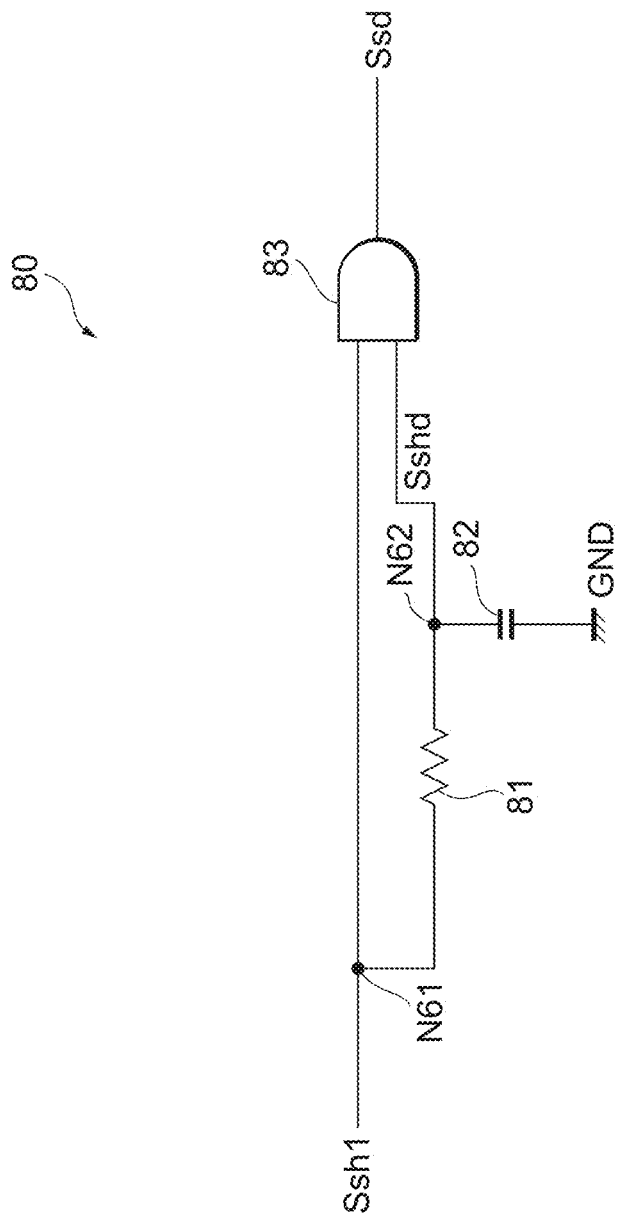
FIG. 11 is a circuit diagram illustrating an example of a first shunt circuit state detector according to one embodiment.

FIG. 11 is a circuit diagram illustrating an example of the first shunt circuit state detector 80 according to the embodiment. As illustrated in FIG. 11, the first shunt circuit state detector 80 includes, for example, a resistor 81, a capacitor 82, and an AND circuit 83.

One end of the resistor 81 is connected to a node N61 to which the first shunt signal Ssh1 of the first shunt circuit 30 illustrated in FIG. 2 is input, and the other end is connected to a node N62. One end of the capacitor 82 is connected to the node 62, and the other end is connected to the ground GND.

The resistor 81 and the capacitor 82 thus connected constitute an RC circuit to set a time constant determined by the resistance value of the resistor 81 and the capacitance of the capacitor 82 in order to generate a delay signal Sshd for delaying the first shunt signal Ssh1 by a predetermined time.

The first shunt signal Ssh1 of the first shunt circuit 30 and the delay signal Sshd of the resistor 81 and the capacitor 82 are input to the AND circuit 83. The AND circuit 83 performs an AND operation on the first shunt signal Ssh1 and the delay signal Sshd to output the state detection signal Ssd mentioned above. In other words, when both the first shunt signal Ssh1 and the delay signal Sshd are in the H level, the state detection signal Ssd becomes the H level, while when at least either of the first shunt signal Ssh1 and the delay signal Sshd is in the L level, the state detection signal Ssd becomes the L level. Thus, when the first shunt signal Ssh1 is in the H level for a predetermined time or more, the state detection signal Ssd becomes the H level.

Among the four cases mentioned above, the fourth case is a case where the supply voltage Vdd input to the input terminal 11 is higher than or equal to the operating voltage Vop of the protected circuit 10, the rise in the supply voltage Vdd per unit time is smaller than or equal to the first value, and further the supply voltage Vdd cannot be sufficiently decreased by discharging through the first shunt circuit 30.

Figure 12:
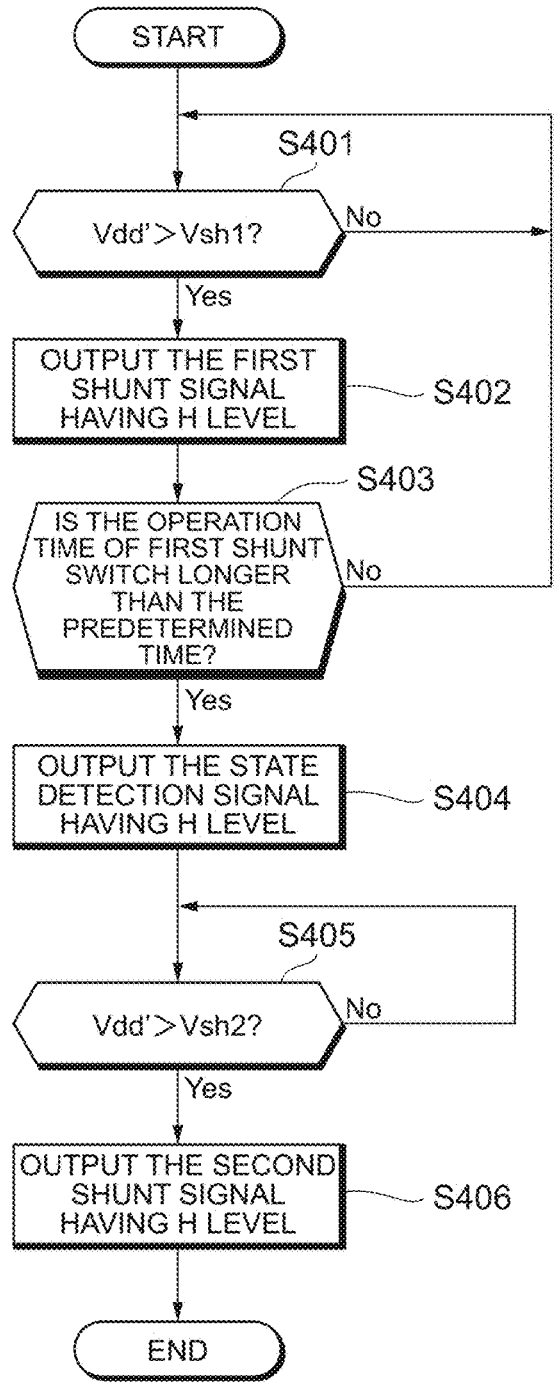
FIG. 12 is a flowchart for describing an example of the operation of the first shunt circuit, the second shunt circuit, and the control circuit according to one embodiment.

FIG. 12 is a flowchart for describing an example of the operation of the first shunt circuit 30, the second shunt circuit 40, and the control circuit 50 according to one embodiment. When the supply voltage Vdd is input to the input terminal 11, the second shunt circuit 40 and the control circuit 50 start a first-and-second shunt process S400 illustrated in FIG. 12. At the start of the first-and-second shunt process S400, the switch 61a illustrated in FIG. 6 is off and the switch 61b illustrated in FIG. 6 is on.

Since steps S401 and S402 in the first-and-second shunt process S400 are the same as the steps S101 and S102 in the first shunt process S100 illustrated in FIG. 4, the description thereof will be omitted.

As illustrated in FIG. 12, after step S402, the first shunt circuit state detector 80 determines whether the operating time of the first shunt switch 35 is longer than a predetermined time (S403).

As a result of the determination in S403, when the operating time of the first shunt switch 35 is not longer than the predetermined time, the first shunt circuit 30 repeats steps S401 to S403.

On the other hand, as a result of the determination in S403, when the operating time of the first shunt switch 35 is longer than the predetermined time, it is considered that the supply voltage Vdd cannot be sufficiently decreased by discharging through the first shunt circuit 30. For example, there is a case where weak sunlight enters a photovoltaic electric source to increase generated voltage of the electric source, and the slope of this generated voltage is smaller than or equal to the first value, or the like. In this case, the first shunt circuit state detector 80 outputs the state detection signal Ssd having the H level (S404). Thus, the enable signal Sen of the OR circuit 51 illustrated in FIG. 2 is changed from the L level to the H level, and the second comparator 43 in the second shunt circuit 40 is activated.

Since steps S405 and S406 in the first-and-second shunt process S400 are the same as the steps S204 and S205 in the second shunt process S200 illustrated in FIG. 7, the description thereof will be omitted.

After step S406, the first shunt circuit 30, the second shunt circuit 40, and the control circuit 50 complete the first-and-second shunt process S400.

Figure 13:
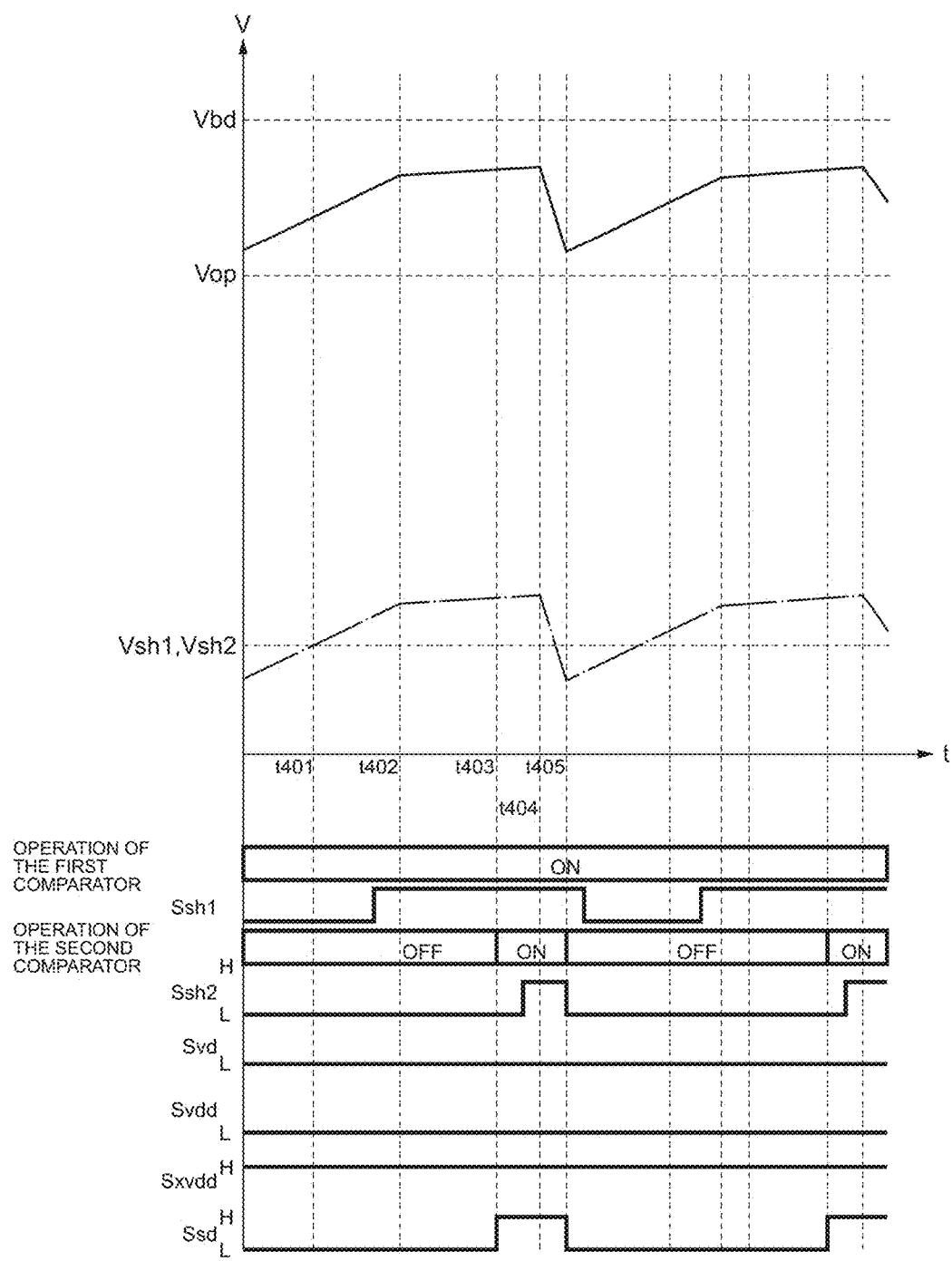
FIG. 13 is a timing chart for describing the example of the operation of the first shunt circuit, the second shunt circuit, and the control circuit according to one embodiment.

FIG. 13 is a timing chart for describing the example of the operation of the first shunt circuit 30, the second shunt circuit 40, and the control circuit 50 according to one embodiment. In FIG. 13, the horizontal axis represents time, and in the upper graph of FIG. 13, the vertical axis represents voltage with the supply voltage Vdd indicated by the solid line and the divided supply voltage Vdd' indicated by the dot-and-dash line.

Since operations at times t401 and t402 are the same as the operations at times t101 and t102 illustrated in FIG. 5, the description thereof will be omitted.

As illustrated in FIG. 13, electric current flows through the first shunt pathway 34 to discharge at time t402. However, since the slope of the supply voltage Vdd is more than the discharge capacity of the first shunt pathway 34, the supply voltage Vdd and the divided supply voltage Vdd' do not drop and continue to rise slowly. Then, since the divided supply voltage Vdd' is higher than the first shunt voltage Vsh1, the first shunt signal Ssh1 remains in the H level, but since the slope of the supply voltage Vdd is smaller than or equal to the first value, the operation of the second comparator remains off.

When the first shunt signal Ssh1 having the H level is maintained longer than a predetermined time, the state detection signal Ssd is changed from the L level to the H level at time t403 to turn on the operation of the second comparator 43 in the second shunt circuit 40.

When the operation of the second comparator 43 is turned on at time t403, since the divided supply voltage Vdd' exceeds the second shunt voltage Vsh2, the second shunt signal Ssh2 becomes the H level. In practice, since a response delay occurs in the second comparator 43, the second shunt signal Ssh2 is changed from the L level to the H level at timing after a predetermined time has elapsed from time t403.

Next, when the second shunt signal Ssh2 becomes the H level during a period between time t403 and time t404, the second shunt switch 45 is turned on. In practice, since a response delay occurs in the second shunt switch 45, the second shunt switch 45 is changed from off to on at timing after a predetermined time has elapsed since the second shunt signal Ssh2 became the H level. As a result, high electric current flows into the second shunt pathway 44 at time t404. Thus, for a supply voltage Vdd that cannot be decreased by discharging through the first shunt circuit 30, a high electric current can be discharged through the second shunt circuit 40 at high speed to decrease the supply voltage Vdd and the divided supply voltage Vdd' rapidly.

Next, when the state detection signal Ssd is changed from the H level to the L level at time t405, the operation of the second shunt circuit 40 is turned off. In other words, the second shunt signal Ssh2 becomes the L level, the second shunt switch 45 is turned off, and the drop in the supply voltage Vdd and the divided supply voltage Vdd' is stopped.

On the other hand, when the divided supply voltage Vdd' drops to fall below the first shunt voltage Vsh1, the first shunt signal Ssh1 becomes the L level. In practice, since a response delay occurs in the first comparator 33, the first shunt signal Ssh1 is changed from the H level to the L level at timing after a predetermined time has elapsed since the divided supply voltage Vdd' fell below the first shunt voltage Vsh1. As a result, the first shunt switch 35 is turned off after time t405.

Further, since the rise in the supply voltage Vdd per unit time is smaller than or equal to the first value, the variation detection signal Svd of the input voltage variation detector 60 illustrated in FIG. 6 is in the L level. As a result, the delay signal Svdd is in the L level, and the exclusive delay signal Sxvdd is in the H level.

FIG. 13 illustrates an example in which the first shunt voltage Vsh1 and the second shunt voltage Vsh2 have the same value, but this is merely a non-limiting example. The first shunt voltage Vsh1 and the second shunt voltage Vsh2 may have different values.

Thus, according to the protecting circuit 20 and the integrated circuit 100 of one embodiment, the first shunt circuit 30 including the first shunt pathway 34 connected to the input terminal 11 and configured to have a relatively low discharge capacity of the first shunt pathway 34 and a relatively long response time is provided. Therefore, for example, when indoor light enters a photovoltaic electric source to generate supply voltage Vdd having a low voltage value, the first shunt circuit 30 operates to enable discharge electric current based on the input voltage Vdd into the first shunt pathway 34. At this time, although the first shunt circuit 30 continues to operate while the supply voltage Vdd is input, the power consumption is low.

The protecting circuit 20 and the integrated circuit 100 further includes: the second shunt circuit 40 including the second shunt pathway 44 connected to the input terminal 11 and configured to have a relatively high discharge capacity of the second shunt pathway 44 and a relatively short response time; and the control circuit 50 configured to enable the second shunt pathway 44 to discharge based on a time variation of supply voltage Vdd input to the input terminal 11. Therefore, for example, when sunlight suddenly enters the photovoltaic electric source on which indoor light was incident to generate supply voltage Vdd having a high voltage value, since the time variation of the supply voltage Vdd becomes great, the control circuit 50 can discharge high electric current into the second shunt pathway 44 at high speed based on the time variation of this supply voltage Vdd. Although the power consumption of the second shunt circuit 40 is high, the control circuit 50 can operate the second shunt circuit 40 only when the time variation of the supply voltage Vdd is great, and this can suppress the power consumption of the second shunt circuit 40. Therefore, the protected circuit 10 can be protected by discharging electric current sufficient for supply voltage Vdd having a large time variation while suppressing power consumption when the time variation of the supply voltage Vdd is small.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

As used herein, "coupled" may mean connected directly or connected indirectly through one or more intervening components. References herein to "an embodiment", "one embodiment", "the embodiment", "an example embodiment", "some embodiments", or similar phrases, indicate that the described embodiment(s) may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A protecting circuit, comprising:
a first shunt circuit including a first shunt pathway coupled to an input terminal, the first shunt circuit being configured to have a first discharge capacity of the first shunt pathway and a first response time;
a second shunt circuit including a second shunt pathway coupled to the input terminal, the second shunt circuit being configured to have a second discharge capacity of the second shunt pathway and a second response time, wherein the second discharge capacity is higher than the first discharge capacity and the second response time is shorter than the first response time; and
a control circuit configured to operate the second shunt pathway based on a time variation of an input voltage at the input terminal and based on an operating time of the first shunt pathway.

2. The protecting circuit of claim 1, wherein:
the first shunt circuit further includes a first shunt switch coupled in the first shunt pathway and a first comparator configured to drive the first shunt switch based on the input voltage; and
the second shunt circuit further includes a second shunt switch coupled in the second shunt pathway and a second comparator configured to drive the second shunt switch based on the input voltage.

3. The protecting circuit of claim 2, wherein the control circuit includes an input voltage variation detector configured to activate the second comparator when an increase in the input voltage per unit time is greater than a first value.

4. The protecting circuit of claim 3, wherein the input voltage variation detector is further configured to activate the second comparator when the increase in the input voltage per unit time is greater than a second value that is smaller than the first value, after the second comparator is activated based on the first value.

5. The protecting circuit of claim 3, wherein the control circuit includes a shunt circuit state detector configured to activate the second comparator when an operating time of the first shunt switch is longer than a predetermined time.

6. The protecting circuit of claim 1, wherein the control circuit is further configured to enable the second shunt pathway to discharge based on a discharge time of the first shunt pathway.

7. An integrated circuit, comprising:
a protected circuit coupled to an input terminal; and
a protecting circuit coupled between the protected circuit and the input terminal, the protecting circuit comprising:
a first shunt circuit including a first shunt pathway coupled to the input terminal, the first shunt circuit being configured to have a first discharge capacity of the first shunt pathway and a first response time;
a second shunt circuit including a second shunt pathway coupled to the input terminal, the second shunt circuit being configured to have a second discharge capacity of the second shunt pathway and a second response time, wherein the second discharge capacity is higher than the first discharge capacity and the second response time is shorter than the first response time; and
a control circuit configured to operate the second shunt pathway based on a time variation of an input voltage at the input terminal and based on an operating time of the first shunt pathway.

8. The integrated circuit of claim 7, wherein:
the first shunt circuit is configured to enable the first shunt pathway to discharge based on the input voltage; and
the second shunt circuit is configured to enable the second shunt pathway to discharge based on the input voltage.

9. The integrated circuit of claim 7, wherein the control circuit includes an input voltage variation detector configured to activate the second shunt circuit when an increase in the input voltage per unit time is greater than a first value.

10. The integrated circuit of claim 9, wherein the input voltage variation detector is further configured to activate the second shunt circuit when the increase in the input voltage per unit time is greater than a second value that is smaller than the first value, after the second shunt circuit is activated based on the first value.

11. The integrated circuit of claim 7, wherein the control circuit includes a shunt circuit state detector configured to activate the second shunt circuit when an operating time of the first shunt circuit is longer than a predetermined time.

12. The integrated circuit of claim 7, wherein the control circuit is further configured to enable the second shunt pathway to discharge based on a discharge time of the first shunt pathway.

13. The integrated circuit of claim 7, wherein the control circuit is configured to operate the second shunt circuit when the time variation of the input voltage is greater than a predetermined variation value.

14. A method, comprising:
applying an input voltage to an input terminal, wherein a protecting circuit is coupled between the input terminal and a protected circuit;

enabling a first shunt circuit in the protecting circuit to discharge based on the input voltage, wherein the first shunt circuit is configured to have a first discharge capacity and a first response time; and operating a second shunt circuit based on a time variation of the input voltage and based on an operating time of the first shunt circuit, wherein the second shunt circuit is configured to have a second discharge capacity and a second response time, wherein the second discharge capacity is higher than the first discharge capacity and the second response time is shorter than the first response time.

15. The method of claim 14, further comprising activating the second shunt circuit when an increase in the input voltage per unit time is greater than a first value.

16. The method of claim 15, further comprising activating the second shunt circuit when the increase in the input voltage per unit time is greater than a second value that is smaller than the first value, after activating the second shunt circuit based on the first value.

17. The method of claim 14, further comprising activating the second shunt circuit when the operating time of the first shunt circuit is longer than a predetermined time.

18. The method of claim 14, further comprising enabling the second shunt circuit to discharge based on a discharge time of the first shunt circuit.

19. The method of claim 14, further comprising enabling the second shunt circuit when the time variation of the input voltage is greater than a predetermined variation value.

20. The method of claim 14, further comprising discharging electric current to protect the protected circuit when the input voltage has a first time variation, and suppressing the protecting circuit from consuming power when the input voltage has a second time variation that is smaller than the first time variation.

* * * * *